United States Patent

[11] 3,630,333

[72] Inventors Paul J. Schiefer
  Sherman Oaks;
  James D. McFarland, Jr., Chatsworth, both of Calif.
[21] Appl. No. 265
[22] Filed Jan. 2, 1970
[45] Patented Dec. 28, 1971
[73] Assignee Schiefer Manufacturing Company
  Monterey Park, Calif.

[54] CLUTCH WITH DIAPHRAGM AND CLIP SPRINGS FOR PARALLEL
  10 Claims, 5 Drawing Figs.
[52] U.S. Cl...................................................... 192/99 A, 192/89 B
[51] Int. Cl...................................................... F16l 23/20
[50] Field of Search........................................... 192/99 A, 89 B, 70.27

[56] References Cited
  UNITED STATES PATENTS
  3,323,624  6/1967  Maurice ...................... 192/89 B
  3,450,241  6/1969  Kuno............................ 192/89 B Primary Examiner—Benjamin W. Wyche
Assistant Examiner—Randall Heald
Attorney—Christie, Parker & Hale ABSTRACT: The diaphragm of a diaphragm clutch is urged toward its engagement position by assist springs to overcome the effect of centrifugal force which tends to keep the diaphragm in its disengaged position. The assist springs are coupled to the diaphragm and the clutch cover to prevent their displacement by centrifugal force. To this end, a hook-shaped portion of each assist spring engages the inside of a pair of pivot rings for the diaphragm to secure the assist springs at one end. The other end of each assist spring is received in a hole in the clutch cover. For rigidity, the clutch cover is adapted for full 360° register with a flywheel and employs reinforcing ribs proximate the anchor points on the clutch cover of the drive straps which carry the pressure plate.

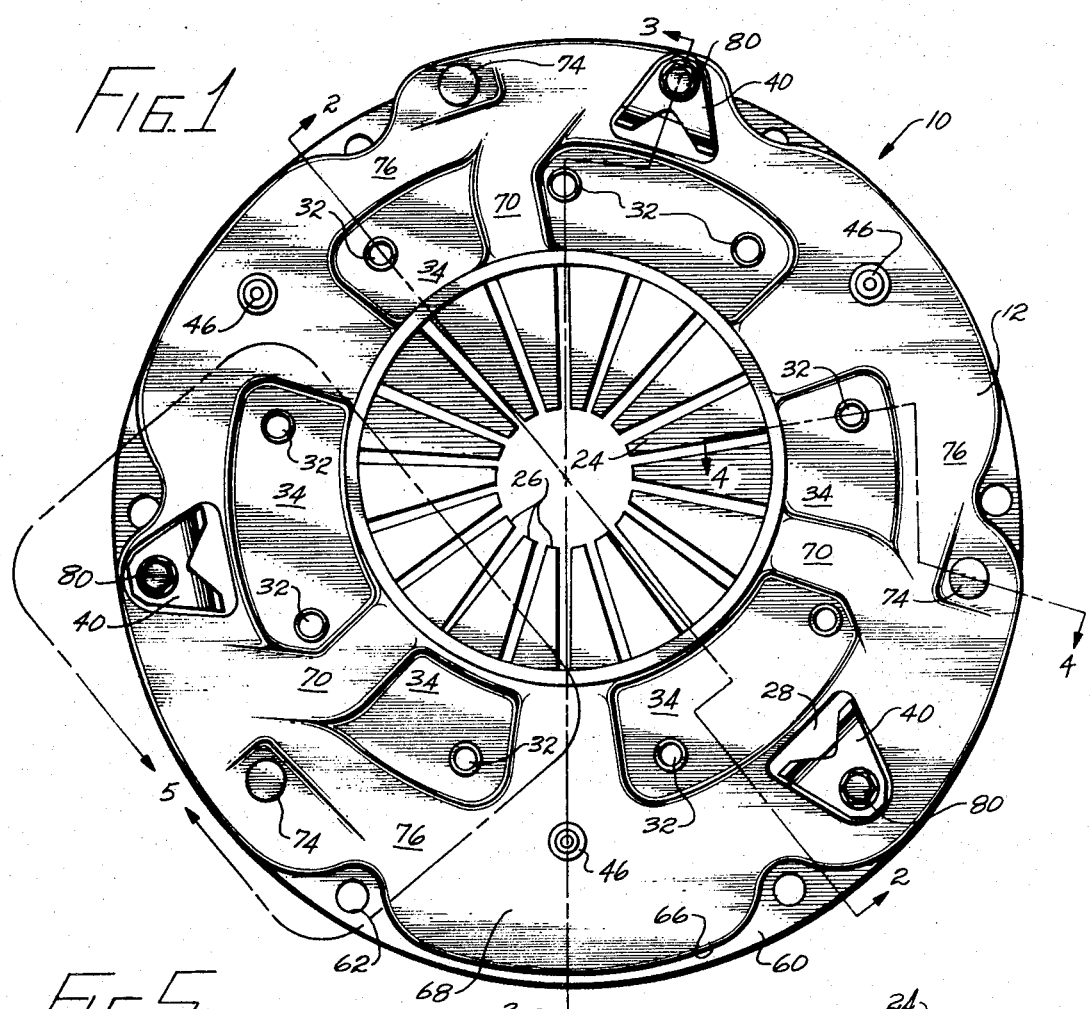
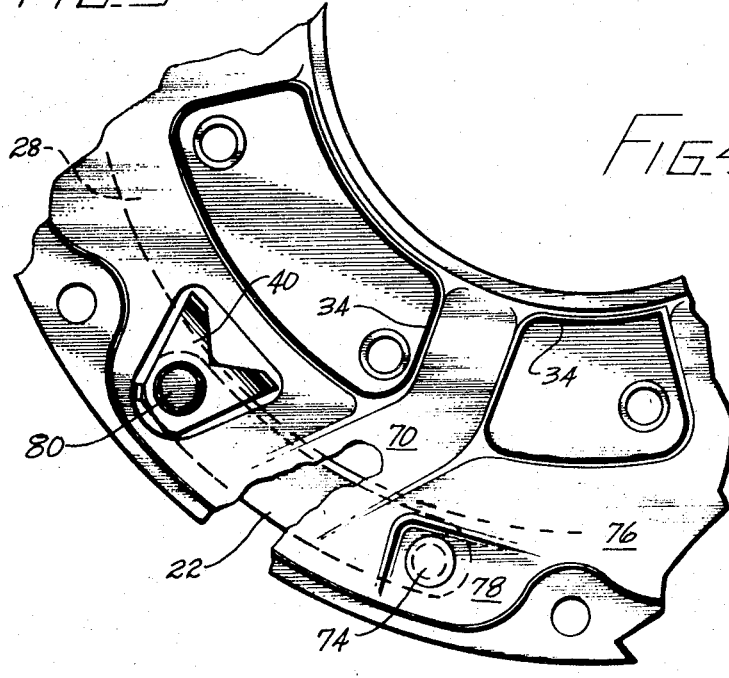
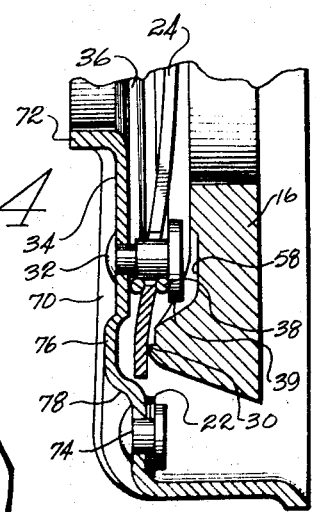

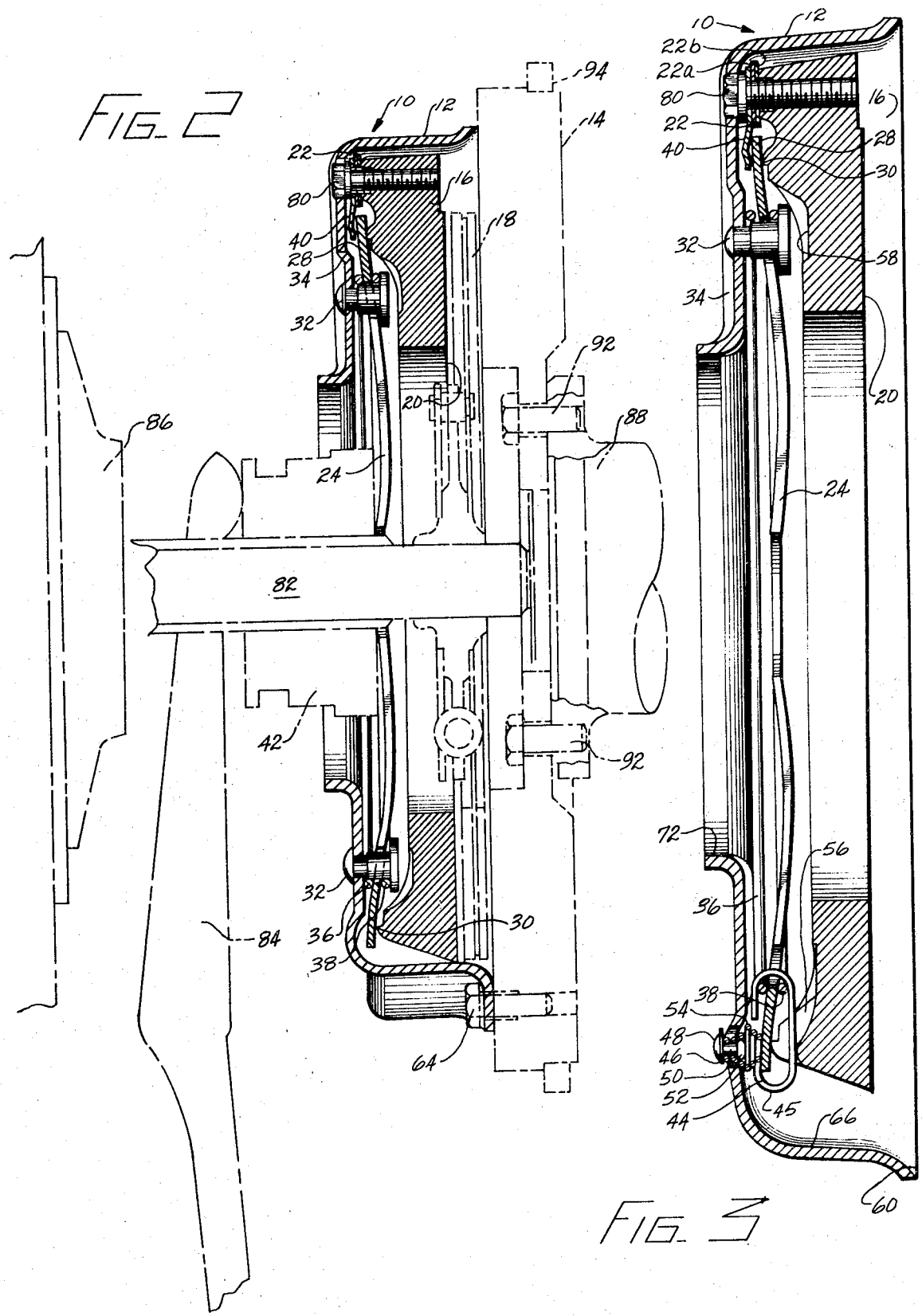

3,630,333

CLUTCH WITH DIAPHRAGM AND CLIP SPRINGS FOR PARALLEL

BACKGROUND OF THE INVENTION

The present invention relates to clutches in general and, more in particular, to diaphragm type clutches.

Diaphragm clutches are used where a continuous 360° force is requires on a pressure plate to maintain its engagement with a clutch disc assembly.

Diaphragm clutches employ a diaphragm to maintain the clutch's pressure plate in engagement with the clutch disc assembly. Typically, the diaphragm has an a annular section for bearing on the pressure plate and several fingers for engagement by a clutch release bearing. The diaphragm takes a substantially flat or planar configuration when the clutch is disengaged. When disengaged and at high engine speeds, centrifugal force acting on the diaphragm tends to keep it disengaged.

Another problem, which is especially acute in high performance clutches, is in maintaining effective pressure engagement between the pressure plate and the flywheel. One of the problems which tends to aggravate the engagement problem is the lack of rigidity of the clutch cover.

SUMMARY OF THE INVENTION

The present invention provides a diaphragm clutch which has assist springs to urge the diaphragm to its engaged position from its disengaged position to overcome the effect of centrifugal force. The present invention also provides an improved diaphragm clutch having substantially increased rigidity by using a full 360° register between the clutch cover and the flywheel and reinforcing ribs proximate the attachment point of the drive straps which couple the pressure plate to the clutch cover.

In a specific form, the present invention includes a clutch cover adapted for mounting on a flywheel of an engine which houses a pressure plate and a standard diaphragm. The diaphragm is secured to the clutch cover as by a plurality of rivets. A first pivot ring between the diaphragm and the clutch cover is provided for movement of the diaphragm from its disengaged to its engaged position. A second pivot ring between the diaphragm and the rivets provides pivotal bearing for the diaphragm between its engaged and disengaged positions. The diaphragm bears against the pressure plate along an annular band proximate the outer radial limit of the diaphragm. The diaphragm is also coupled to the pressure plate through holddown clips secured to the pressure plate to enable it to be disengaged by the diaphragm. The pressure plate itself is carried by the clutch cover through the drive straps.

The diaphragm takes a substantially flat or planar configuration when it is in its disengaged position. This occasions a problem at high engine speeds because centrifugal force acting on the diaphragm tends to overcome the spring force of the diaphragm which would otherwise move the diaphragm and the pressure plate to their engaged positions. By the present invention, this problem is overcome through the use of assist springs which urge the diaphragm into its engaged position notwithstanding high engine speeds and the resulting effect of centrifugal force on the diaphragm.

In greater detail, the assist springs are carried by the clutch cover and bear against the diaphragm to act on it and on the pressure plate to urge the two into their engaged positions. The springs are in compressive bearing with the diaphragm. The springs, of course, will be influenced by centrifugal force. To prevent centrifugal force from displacing the springs with the resulting loss of their function, each spring is constrained at its end to prevent radial displacement. This constraint is effected by providing a hook-shaped portion on each spring which passes inside the pivot rings. The spring is also carried by the clutch cover such that it will not be displaced by centrifugal force at this mounting. In a preferred embodiment of the present invention, the mounting of each of the springs to the clutch cover is effected between a "pop"-type rivet and the wall of a hole in the clutch cover. To prevent coil binding of the springs, the springs are preferably made in a conical configuration.

The present invention also contemplates the provision of a rigid clutch cover to assure maximum engagement between the pressure plate and a cooperating clutch disc assembly. This is effected by providing a 360° register in the mounting of the clutch cover to a flywheel. With the 360° register, more clutch cover material is available to make it rigid. Rigidity is almost enhanced by providing reinforcing ribs proximate the anchor points in the clutch cover of the drive straps used to carry the pressure plate. These ribs, in a preferred embodiment, extend radially from a central opening in the cover a predetermined distance, at which point they extend angularly between the drive strap anchor points in the clutch cover and the ends of the drive straps which are attached to the pressure plate.

These and other features, aspects and advantages of the present invention will become more apparent from the following description, appended claims and drawings.

BRIEF DESCRIPTION OF THE FIGURES

FIG. 1 is a top view, essentially plan, of the preferred embodiment of the diaphragm clutch of the present invention;

FIG. 2 is a half-sectional view taken along line 2—2 of FIG. 1 illustrating the clutch assembly of the present invention with attendant prior art mechanisms, with the illustrated diaphragm and pressure plate disengaged;

FIG. 3 is a view taken along line 3—3 of FIG. 1, with the illustrated diaphragm and pressure plate disengaged illustrating the assist springs of the present invention;

FIG. 4 is a partial elevational, sectional view taken along line 4—4 of FIG. 1 illustrating the reinforcing ribs of the present invention; and FIG. 5 is a fragmentary plan view taken in the area indicated in FIG. 1 illustrating the reinforcing ribs of the present invention and the mounting of the drive straps.

DESCRIPTION OF THE PREFERRED EMBODIMENTS

Initially, with reference to FIGS. 1 through 3, the improved diaphragm clutch of the present invention is indicated generally by reference numeral 10. The clutch includes a clutch cover 12 secured to a standard flywheel 14. A standard pressure plate 16 is disposed within the clutch cover for engaging a standard clutch disc assembly 18. As is known, the pressure plate forces the clutch disc assembly into engagement with the flywheel for the transmission of power from an engine to the drive train of a vehicle. For this purpose the pressure plate has an engaging surface 20 disposed to bear against a cooperating surface of the clutch disc assembly. The pressure plate "floats" within clutch cover 12 through three pairs of angularly disposed drive straps 22, illustrated in greatest detail in FIG. 5. This coupling will be described in greater detail subsequently. A standard diaphragm 24 within the clutch cover provides for the pressure engagement of the pressure plate with the clutch disc assembly and also provides for the disengagement of the pressure plate from the clutch disc assembly.

The diaphragm has a generally annular ring and a plurality of inwardly extending flanges 26. The annular ring, indicated by reference numeral 28, is disposed to bear against annular boss 30 of the pressure plate. The diaphragm is of spring steel or the like, and, in assembly, is deformed such that it will always exert a pressure force on the pressure plate to urge the latter towards its engagement position, that is to the right in FIGS. 2 and 3. The diaphragm is carried by the clutch cover through a plurality of regularly placed rivets 32. Each of these rivets passes through an oversized hole 33 in diaphragm 24. The rivets are secured to the cover in recesses 34 thereof. A pair of diaphragm pivot rings 36 and 38 extend circumferentially about the longitudinal axis of the clutch assembly. Pivot ring 36 bears against the inside of the clutch cover and the diaphragm to provide a pivot or fulcrum for the diaphragm to move from its disengaged position to its engaged position. Pivot ring 38 provides a pivot or fulcrum for the diaphragm to move from its engaged to its disengaged position. Each rivet 32 has an annular flange 39 for ring 38 to bear against. To force the pressure plate into its disengaged position, a plurality of spring mounting clips 40 are secured to the pressure plate and overlie diaphragm 24. Movement of a clutch release or throwout bearing 42 towards flywheel 14 will pivot diaphragm 24 about ring 38 such that the diaphragm bears against spring clips 40 and forces the pressure plate out of engagement with the clutch disc assembly.

It will be noted that the diaphragm illustrated in FIGs. 2 and 3, in its disengaged position, is relatively flat. At high engine speeds or r.p.m.'s a significant centrifugal force acts on the diaphragm which tends to maintain it in this generally flat configuration. This centrifugal force is sufficient to overcome the natural tendency of the diaphragm to force the pressure plate into pressure engagement with the clutch disc assembly. To overcome this problem, the present invention provides assist springs which are an insensitive centrifugal force to urge the pressure plate into engagement with the clutch disc assembly even at high engine speeds. These assist springs are indicated by reference numeral 44, and one of them is shown in detail in FIG. 3. Each assist spring has a hook-shaped first section 45 which passes around the inside of pivot rings 36 and 38 and engages these rings in tension to anchor the assist spring to the rings and diaphragm against centrifugal force which would otherwise tend to displace the spring out of position. The pivot rings, in turn, are maintained in index by their engagement with the hook-shaped sections of the assist springs. The assist springs are also anchored to the clutch cover in such a manner that centrifugal force will not displace the springs at this point.

Specifically, each of the assist springs is anchored to the clutch cover through a cooperating "pop"-type rivet 46. Each pop rivet has a head 48, shank 50 and an upset interior end 52. The spring passes around the interior end of the shank for bearing against the inside of the head of the rivet. It will be noted in FIG. 3 that the portion of the spring surrounding the pop-type rivet is generally conical. This is to avoid coil binding. As is evident in FIG. 3, the upset end of each pop rivet acts through the spring and on the clutch cover to anchor the spring to the clutch cover. An intermediate section 54 of each assist spring provides the actual compressive bearing on the diaphragm to urge the pressure plate towards its engaged position. This intermediate section is conical to avoid coil binding.

The pressure plate is recessed at 56 to receive the hooked end of the assist spring. The pressure plate is also recessed at 58 to receive rivets 32.

The clutch cover has a 360° continuous mounting flange 60 for bearing against flywheel 14. At regular intervals around the mounting flange are located fastener holes 62 for receiving fasteners 64 for the actual mounting of the clutch cover to the flywheel. The cover is recessed about these fastener holes to afford wrenching tool access. The mounting flange merges into an axial circumferential wall 66 which extends 360° around the axis of the clutch assembly. The clutch cover has a top 68 which is reinforced by a plurality of ribs 70 to afford rigidity to the clutch assembly. These ribs extend radially from an axially extending flange 72 to a point radially inside of driving straps 22 and radially outside of mounting rivets 32. At this point each of the reinforcing ribs extends at an acute angle to the radius it was following between the anchor point of the most proximate driving strap and spring clip 40, the anchor points being rivets and indicated by reference numeral 74. Circumferential rib 76 is also provided for rigidity. This rib is outwardly of recesses 34 and inwardly of wall 66. As seen to best effect in FIG. 3, ribs 70 provide rigidity in the vicinity of the anchor point of the driving straps. It is here that the substantial force of diaphragm 24 on pressure plate 16 is manifested in cover 12. With the rigidity afforded by these ribs, deflection of the cover under the forces attendant with clutch operation is minimized and complete engagement of the pressure plate with the clutch assembly is afforded.

With specific reference to FIG. 5, circumferential rib 76 as well as the radial ribs are more clearly depicted. As seen here, the circumferential rib and radial ribs are raised from recesses 34 and recesses 78, which receive anchor rivets 74 for drive straps 22. As seen in FIG. 4, ribs 70 are raised relative to circumferential rib 76.

With reference to FIG. 5, drive straps 22 are shown. These drive straps are anchored by anchor rivets 74 to cover 12 on the inside of recesses 78. The drive straps are also anchored to pressure plate 16 by bolts 80. Spring clips 40 are also secured to the pressure plate through these bolts. The drive straps are arc shaped with a center of curvature for both of each strap sides at the longitudinal axis of the clutch assembly. Each drive strap pair 22 consists of two individual straps 22a and 22b.

With more brief reference again to FIG. 2, the attendant apparatus employed with the improved diaphragm clutch of the present invention will be described for the purpose of describing the operation of the clutch assembly. A splined main input transmission shaft 82 slidably receives, through splines, clutch disc assembly 18. The clutch disc assembly is free to move axially along the input shaft. As is well known, the clutch disc assembly is responsible for the transmission of power from flywheel 14 to input shaft 82 when engaged by pressure plate 16. Clutch disengagement is effected through clutch throwout bearing 42 which is slidably received on splines of input shaft 82 for engaging fingers 26 of diaphragm 24. A release lever 84 is capable of bearing against clutch release bearing to disengage the clutch. Main transmission input shaft 82 drives a transmission 86. A crankshaft 88 terminates at a crankshaft clutch pilot bearing 90. Flywheel 14 is secured to crankshaft 88 by fasteners 92. The flywheel assembly has a ring gear 94 for engagement by a starter.

In operation, release lever 84 is capable of bearing against clutch release bearing 42 to urge it against fingers 26 of diaphragm 24. When this occurs, the fingers of diaphragm 24 will move axially toward crankshaft 88. By virtue of rivets 32, the diaphragm will pivot about pivot ring 38 such that annular portion 28 bears against retaining spring clips 40 with a force axially away from flywheel 14. This force overcomes the opposing force of the diaphragm and assist springs 44 to disengage pressure plate 16. When the pressure plate is disengaged, clutch disc assembly 18 is no longer power coupled to flywheel 14 because there is no axial force to maintain engagement.

At high engine speeds, the diaphragm will take the configuration in its disengaged position shown in FIGS. 2 and 3. It will be noted in these positions that the diaphragm is relatively flat. At these high speeds, a relatively large amount of centrifugal force will be acting on the diaphragm to tend to keep it flat and to prevent it from forcing pressure plate 16 back into engagement with clutch disc assembly 18.

This centrifugal effect is overcome by assist springs 44.

Assist springs 44 are in compressive engagement with annular ring portion 28 of the diaphragm and through this annular ring portion with pressure plate 16 of the clutch assembly. Thus, the assist springs tend to urge the pressure plate into engagement. Once the flat configuration of the diaphragm has been overcome, its natural spring force will again come into play to maintain the pressure plate assembly in firm engagement the clutch disc assembly 18. Engagement is actually effected, then, through the movement of pressure plate 16 axially towards flywheel 14 by virtue of the spring force of the assist springs and the spring force of the diaphragm. Between the disengaged and engaged positions, annular ring portion 28 of the diaphragm will pivot about pivot ring 36 in the direction of the flywheel assembly, while fingers 26 will move away from the flywheel. The diaphragm will bear against annular boss 30 of the pressure plate to maintain this engagement.

The present invention has been described with reference to certain preferred embodiments. The spirit and scope of the appended claims, however, should not necessarily be limited to the foregoing description.

What is claimed is:

1. An improved diaphragm type clutch comprising:
    a. a clutch cover adapted for mounting on a flywheel and having an open end for lying against a flywheel;
    b. a pressure plate inside the clutch cover and carried thereby for movement toward and away from the open end to engage and disengage a clutch assembly;
    c. a diaphragm having an engaged and disengaged position, the diaphragm being carried by the clutch cover for maintenance in a stressed condition with its outer radial portion in compressive bearing with the pressure plate and applying a force thereon to urge the pressure plate toward the open end and into engagement with the clutch disc assembly, the carriage of the diaphragm by the clutch cover being radially inward of the aforementioned outer radial portion of the diaphragm, the clutch cover and the pressure plate providing a force couple which maintains the diaphragm in its stressed condition when the clutch cover is mounted on the flywheel, the diaphragm in its disengaged position being relatively flat;
    d. a plurality of assist springs carried by the clutch cover in compressive bearing on the outer radial portion of the diaphragm to urge the diaphragm against the pressure plate ad overcome the effect of centrifugal force on the diaphragm which would otherwise tend to maintain it in its disengaged position; and
    e. the assist springs and the diaphragm being in parallel force relationship between the clutch cover and the pressure plate.

2. The improved diaphragm type clutch claimed in claim 1 wherein:
    each of the assist springs is a coil spring and has a hook-shaped end extending radially inwardly of the diaphragm from the balance of the spring and hooked through the diaphragm to prevent centrifugal forces from displacing the spring.

3. The improved diaphragm type clutch claimed in claim 2 wherein:
    each of the assist springs has a conical, coiled section in compressive bearing with the diaphragm, the conical section being to prevent coil binding.

4. The improved diaphragm-type clutch claimed in claim 12 wherein:
    each assist spring is secured to the clutch cover by a fastener, each fastener being received in a hole in the clutch cover for limited axial movement relative thereto, each assist spring passing between the wall of its associated fastener's hole and its associated fastener.

5. The improved diaphragm type clutch claimed in claim 4 wherein:
    first and second pivot rings are provided, the first pivot ring being disposed between the clutch cover and the diaphragm to provide a pivot for the diaphragm as it moves from its disengaged position to its engaged position, and the second pivot ring being secured to the clutch cover on the other side of the diaphragm to provide a pivot for the diaphragm as it moves from its engaged position to its disengaged position.

6. The improved diaphragm type clutch claimed in claim 5 wherein:
    the pressure plate is coupled to the cover by a plurality of elongated drive straps disposed on an imaginary circle about the longitudinal axis of the clutch, each drive strap being anchored to the clutch cover at one end and to the pressure plate at its other end, and clip means for each drive strap is provided, each clip means being secured to the pressure plate and overlying the diaphragm to transmit a force applied to the diaphragm to the pressure plate to disengage the pressure plate from the clutch disc assembly.

7. The improved diaphragm-type clutch claimed in claim 6 wherein:
    a reinforcing rib in the clutch cover is provided between each of the anchor points of each of the drive straps to the clutch cover and the anchor point of the corresponding drive strap to the pressure plate.

8. The improved diaphragm type clutch claimed in claim 7 wherein:
    each of the reinforcing ribs is defined by a raised portion in the clutch cover which has a first section extending radially outward to a terminus radially inward of the anchor point of the corresponding drive strap to the clutch cover, and a second section extending at an angle from the first section between the anchor point of the corresponding drive strap to the clutch cover and the anchor point of the corresponding drive strap to the pressure plate.

9. The improved diaphragm type clutch claimed in claim 8 wherein:
    the open end of the clutch cover is defined by a full 360° flange for bearing against the flywheel.

10. The improved diaphragm-type clutch claimed in claim 9 including;
    an annular flange in the clutch cover which is coaxial with the axis of the clutch to define a hole for a main transmission shaft, throwout bearing and the like, the first section of each of the reinforcing ribs extending from this annular flange, and a plurality of circumferentially disposed and spaced-apart depressions adjacent the flange which terminate radially inward of the drive straps, the depressions defining a portion of the reinforcing ribs and a circumferential reinforcing rib in the clutch cover outwardly of their largest radius.

* * * * *